UNITED STATES PATENT OFFICE.

OTTO WOLFES, OF DARMSTADT, GERMANY, ASSIGNOR TO LOUIS MERCK, EMMANUEL AUGUST MERCK, WILHELM MERCK, AND CARL EMMANUEL MERCK, COPARTNERS AS FIRM OF E. MERCK, OF DARMSTADT, GERMANY.

PROCESS OF MANUFACTURING BARBITURIC ACID.

No. 907,665.　　　　Specification of Letters Patent.　　　　Patented Dec. 22, 1908.

Original application filed September 22, 1905, Serial No. 279,689. Divided and this application filed May 23, 1908. Serial No. 434,659.

*To all whom it may concern:*

Be it known that I, OTTO WOLFES, doctor of philosophy, a subject of the Emperor of Germany, residing at the city of Darmstadt, in the Empire of Germany, have invented new and useful Improvements in the Processes of Manufacturing Barbituric Acids, of which the following is a specification.

The present application is a divisional application from my application Serial No. 279689, filed September 22nd 1905, and covers specifically the manufacture of barbituric acids, employing dialkyl malonitrils as starting material.

I have ascertained that if guanyl-urea is condensed with cyan derivatives of the following general formula:

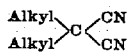

condensation products are obtained which are probably mixtures of several substances for the reason that guanyl-urea is enabled to react in two pseudomeric forms:

a) 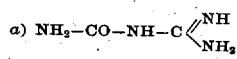

This unsymmetrical form can be condensed with the above-mentioned derivatives to substances of the two following typical formulæ:

1) 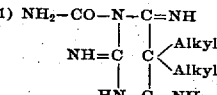

2) 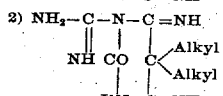

The second symmetrical form:

b) 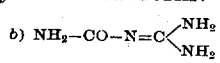

is under the same circumstances condensed to substances of the following typical formula:

3) 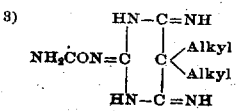

The substances of all these three typical formulæ, when heated with aqueous acids, are easily converted into dialkyl barbituric acids of the well known formula:

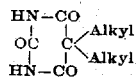

the reactions probably taking place in accordance with the following formulæ:

1) 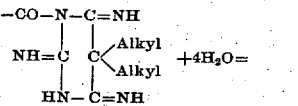

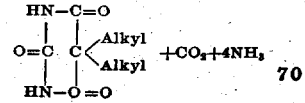

2) 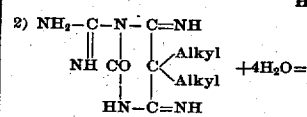

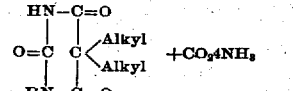

3) 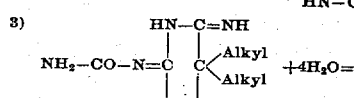

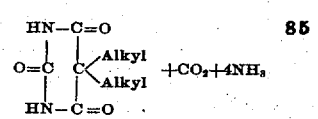

The essential characteristics of the process thus indicated will be seen from the following specific example:

*Example. Guanyl-urea and diethyl malonitrile.*—20 kg. (one half molecular proportion) of dried pulverized guanyl-urea hydrochlorid are suspended in 30 liters of alcohol and are stirred for ½ hour with a solution of 3.5 kg. of sodium (one and one half atomic proportion) in 75 liters of absolute alcohol. Then a filtration is made from the sodium chlorid and the solution of the free guanyl-urea is heated for 7 hours to 100 degrees C. with 12.2 kg. (one molecular proportion) of diethyl malonitrile. The precipitate which forms is directly heated, after its separation from the lye and after it has been washed, together with sulfuric acid of 50% to 100 degrees C. and thereby converted into diethyl barbituric acid.

Having now described my invention and in what manner the same is to be performed, what I claim as new and desire to secure by Letters Patent is:

1. The process of manufacturing dialkyl barbituric acids consisting in condensing guanyl-urea with dialkyl malonitrils of the following general formula:

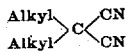

by heating the mixture of the said substances and saponifying the resulting condensation products by treating these products with acids, substantially as described.

2. The process of manufacturing diethyl barbituric acid, consisting in condensing guanyl-urea with diethyl malonitrile of the formula:

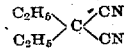

by heating the mixture of the said substances and saponifying the resulting condensation product by treating this product with acids, substantially as described.

In testimony whereof, I have hereunto set my hand in the presence of two subscribing witnesses.

OTTO WOLFES.

Witnesses:
GEORG WARNER,
WALTER HAUSING.

---

Correction in Letters Patent No. 907,665.

It is hereby certified that in Letters Patent No. 907,665, granted December 22, 1908, upon the application of Otto Wolfes, of Darmstadt, Germany, for an improvement in "Processes of Manufacturing Barbituric Acids," an error appears in the printed specification requiring correction as follows: That portion of the formula in line 71, page 1, "$HN-O=O$" should read $HN-C=O$; and that the said Letters Patent should be read with this correction therein that the same may conform to the record of the case in the Patent Office.

Signed and sealed this 9th day of February, A. D., 1909.

[SEAL.]

C. C. BILLINGS,
*Acting Commissioner of Patents.* gether with sulfuric acid of 50% to 100 degrees C. and thereby converted into diethyl barbituric acid.

Having now described my invention and in what manner the same is to be performed, what I claim as new and desire to secure by Letters Patent is:

1. The process of manufacturing dialkyl barbituric acids consisting in condensing guanyl-urea with dialkyl malonitrils of the following general formula:

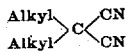

by heating the mixture of the said substances and saponifying the resulting condensation products by treating these products with acids, substantially as described.

2. The process of manufacturing diethyl barbituric acid, consisting in condensing guanyl-urea with diethyl malonitrile of the formula:

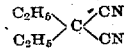

by heating the mixture of the said substances and saponifying the resulting condensation product by treating this product with acids, substantially as described.

In testimony whereof, I have hereunto set my hand in the presence of two subscribing witnesses.

OTTO WOLFES.

Witnesses:
GEORG WARNER,
WALTER HAUSING.

---

It is hereby certified that in Letters Patent No. 907,665, granted December 22, 1908, upon the application of Otto Wolfes, of Darmstadt, Germany, for an improvement in "Processes of Manufacturing Barbituric Acids," an error appears in the printed specification requiring correction as follows: That portion of the formula in line 71, page 1, "HN—O=O" should read *HN—C=O;* and that the said Letters Patent should be read with this correction therein that the same may conform to the record of the case in the Patent Office.

Signed and sealed this 9th day of February, A. D., 1909.

[SEAL.]

C. C. BILLINGS,
*Acting Commissioner of Patents.*

It is hereby certified that in Letters Patent No. 907,665, granted December 22, 1908, upon the application of Otto Wolfes, of Darmstadt, Germany, for an improvement in "Processes of Manufacturing Barbituric Acids," an error appears in the printed specification requiring correction as follows: That portion of the formula in line 71, page 1, "HN—O=O" should read $HN-C=O$; and that the said Letters Patent should be read with this correction therein that the same may conform to the record of the case in the Patent Office.

Signed and sealed this 9th day of February, A. D., 1909.

[SEAL.]

C. C. BILLINGS,
*Acting Commissioner of Patents.*